United States Patent [19]

Case

[11] 4,171,728
[45] Oct. 23, 1979

[54] POWDER WEIGHER

[76] Inventor: Ross F. Case, 903 Gladstone St., Sheridan, Wyo. 82801

[21] Appl. No.: 899,364

[22] Filed: Apr. 24, 1978

[51] Int. Cl.² ............................................. G01G 1/18
[52] U.S. Cl. ..................................... 177/59; 177/145; 177/246
[58] Field of Search ................. 177/59, 171, 246, 145, 177/116, 122, 123

[56] References Cited

U.S. PATENT DOCUMENTS

| | | | |
|---|---|---|---|
| 2,539,030 | 1/1951 | Parker | 177/59 X |
| 3,134,450 | 5/1964 | Hanson | 177/246 X |

*Primary Examiner*—Joseph W. Hartary

[57] ABSTRACT

Weighing apparatus including a supporting stand, a balance scale disposed on the supporting stand, the balance scale having a beam pivotally supported on a fulcrum and a weighing receptacle suspended from the beam adjacent one end thereof, powder-supplying means disposed on the supporting stand above the weighing receptacle, unit dispensing means associated with the powder-supplying means, and powder delivery means disposed on the supporting stand below the weighing receptacle; the weighing receptacle including a conical portion tapering to a bottom opening, a conical plug disposed within the opening with the point of the plug extending upwardly toward the powder-supplying means, the powder delivery means including a conical portion tapering downwardly into a cylindrical portion, actuating means disposed adjacent the cylindrical portion and extending upwardly through the conical portion with the upper end thereof bearing against the underside of the conical plug, stop means associated with the actuating means to limit the downward travel thereof, and handle means affixed to the lower end of the actuating means.

10 Claims, 4 Drawing Figures

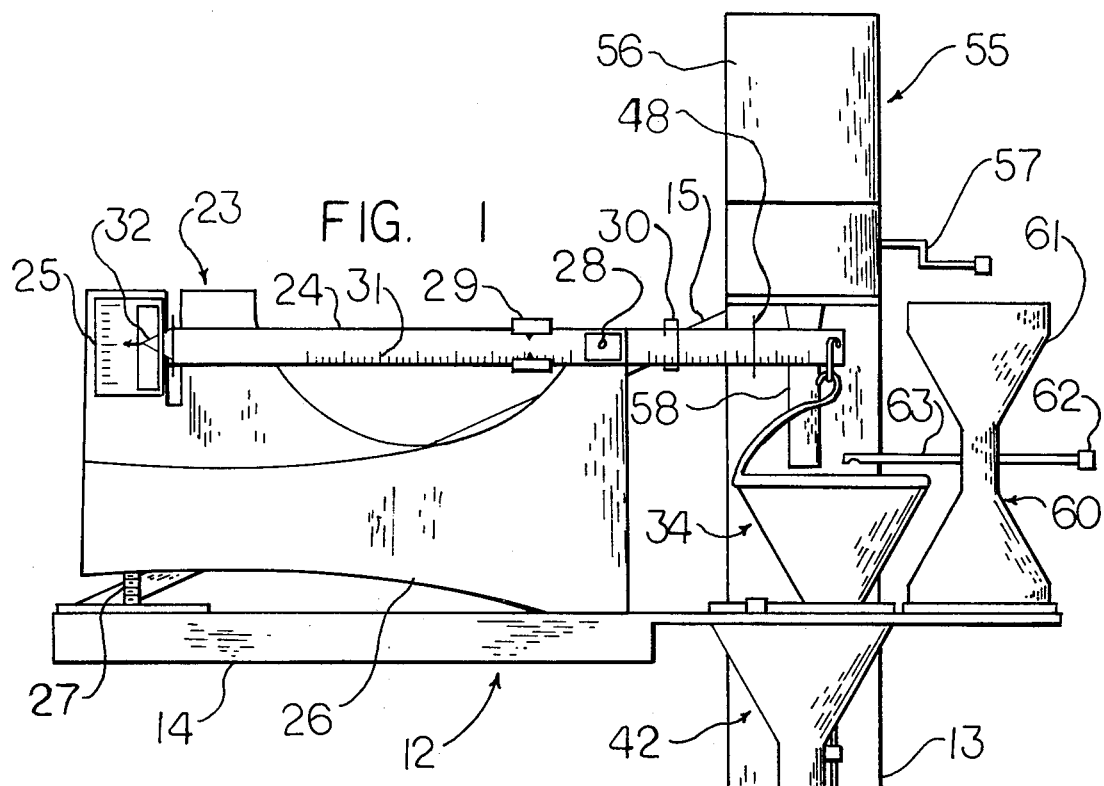
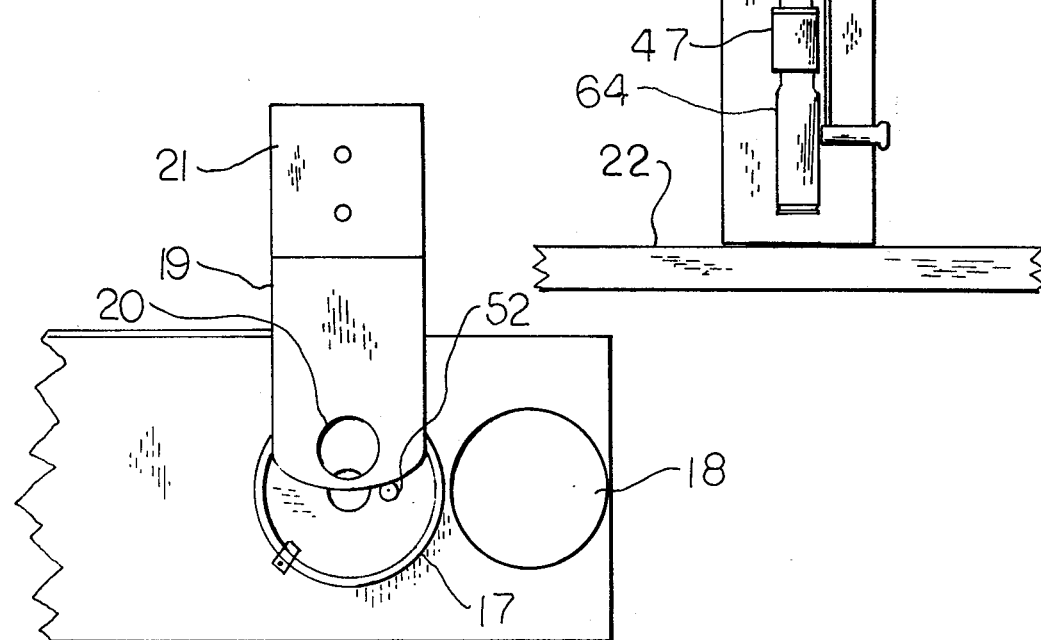
FIG. 1
FIG. 2

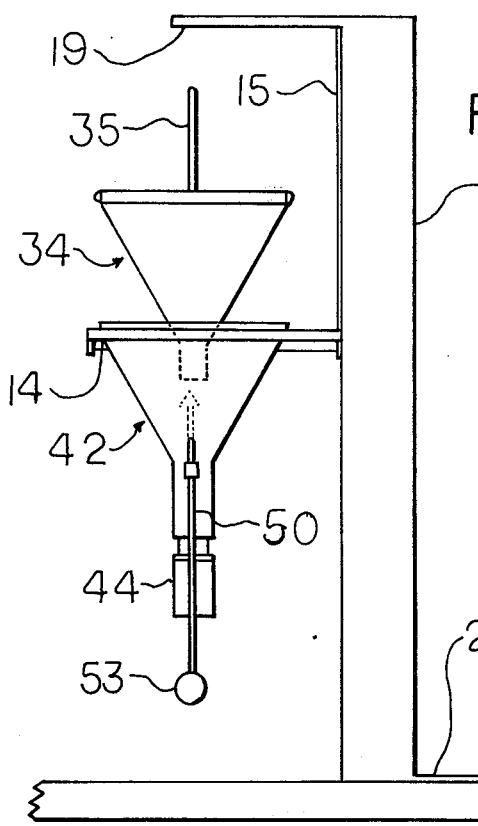
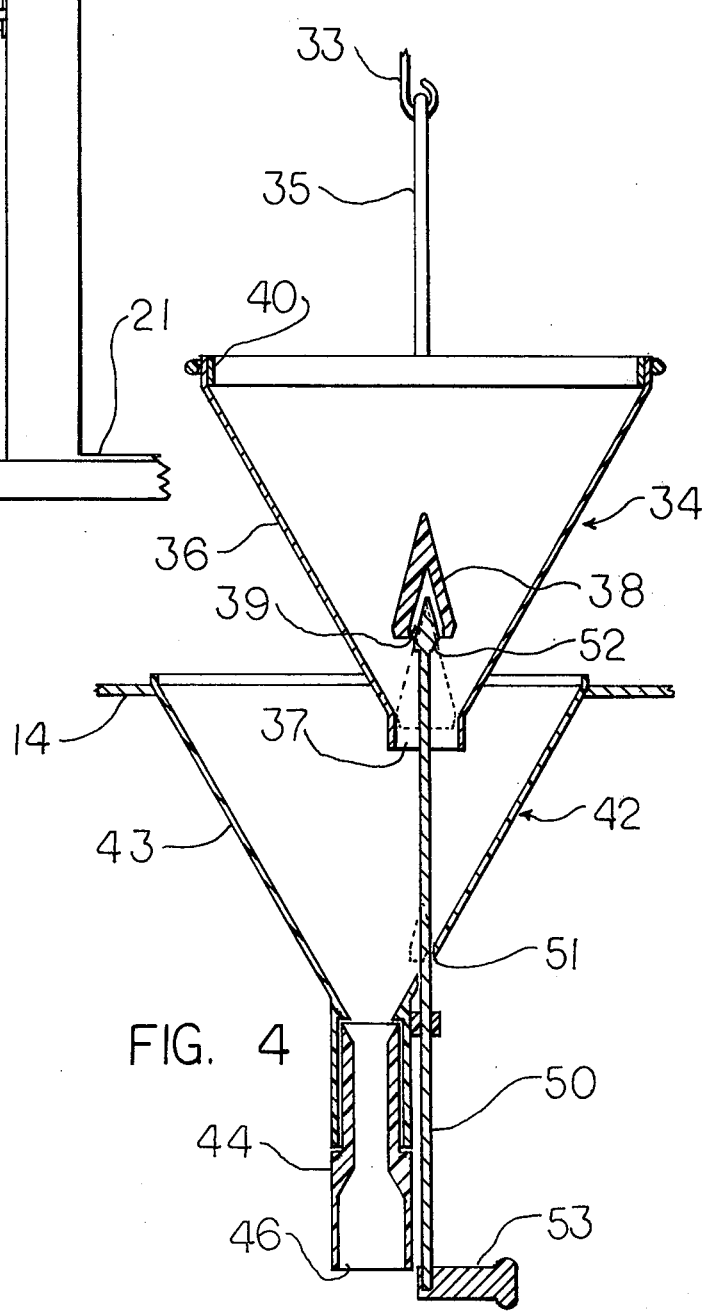

POWDER WEIGHER

This invention relates to a novel apparatus for weighing powders and more particularly relates to a new apparatus for weighing unit quantities of powder on a repetitive basis.

In recent years, the hand loading of rifle and handgun ammunition has become quite popular. Hand loading not only saves the shooter money, but also allows him to customize ammunition to his specific needs. One of the critical factors in loading ammunition is achieving precise control of the quantity of gun powder in each cartridge. Slight variations in the amount of powder can produce significant differences in the ballistic performance thereof.

To achieve uniformity from one cartridge to another, most hand loaders weigh each charge of gun powder separately on a fine balance scale. This generally involves adding powder to a weighing pan on one side of the balance until equilibrium with the counterweights is attained. The pan with the powder in it is removed from the scale and the powder poured through a funnel into a cartridge. For each additional cartridge, the pan is replaced on the scale and the above steps repeated.

One of the problems associated with the above procedure is the constant handling of the weighing pan. Care must be exercised in the removal and replacement of the pan to avoid accidentally changing the settings of the weights or in some other way disturbing the balance of the scale. Also, the individual doing the loading must be careful to ensure that he has no foreign material on his hands when he touches the pan. Any material deposited on the pan or other balancing portions of the scale may change the amount of powder being weighed. The high degree of care required with the pan weighing procedure described above not only is time-consuming, but also it necessitates that the loader give his full attention to the weighing operation rather than to the loading steps themselves.

The present invention provides a novel apparatus for weighing and delivering exact quantities of powder on a repetitive basis. The apparatus of the invention can be operated without touching or removing the weighing pan from the scale. This makes the weighing and transfer of unit quantities of powder simple and convenient. Also, the operations can be performed quickly with the weighing apparatus of the invention which increases the loader's efficiency and greatly reduces the time he must spend to load a given number of cartridges.

Furthermore, since the pan and scale do not have to be touched after the apparatus of the invention is set up, the risk of accidentally disturbing the scale and settings thereof is substantially eliminated. The apparatus does not adversely affect the accuracy of the scale. In fact, the apparatus may increase the accuracy of the scale because foreign material is not transferred to the weighing pan by handling.

Moreover, powder weighed with the apparatus of the invention is transferred directly to a cartridge positioned below the delivery outlet so spillage is greatly reduced. In addition, the apparatus is convenient to operate with a minimum of instruction and can be operated with a minimum of care and attention. The apparatus is simple in design and can be fabricated from available components relatively inexpensively.

Other benefits and advantages of the novel apparatus of the present invention will be apparent from the following description and the accompanying drawings in which:

FIG. 1 is a side elevation of one form of the weighing apparatus of the invention;

FIG. 2 is a fragmentary top view of the supporting stand portion of the apparatus shown in FIG. 1;

FIG. 3 is a right end view of the weighing receptacle and delivery portions of the apparatus shown in FIG. 1; and FIG. 4 is an enlarged side view of the weighing receptacle and delivery portions of the apparatus shown in FIG. 1.

As shown in the drawings, one form of the novel weighing apparatus of the present invention includes a supporting stand 12 with a vertical section 13 and a main platform 14. A brace 15 extends between the left end of platform 14 and vertical section 13. Platform 14 has an opening 17 therethrough at a point adjacent vertical section 13. To the right of opening 17 is a recess 18. At the top of vertical section 13 is located an upper platform 19 with an opening 20. Advantageously, supporting stand 12 has a horizontal flange section 21 extending from the bottom of vertical section 13 to facilitate clamping, bolting or otherwise securing the stand to a bench or similar work surface 22.

A balance scale 23 is positioned on the left side of platform 14 with the right end of balance beam 24 thereof above opening 17. Scale 23 includes a base 26 with leveling screw 27. At the right end of base 26 is located a fulcrum 28 on which balance beam 24 is pivotally suspended. Beam 24 has a large weight 29 and smaller weights 30 and 48 slidably disposed on either side of fulcrum 28. Beam 24 has calibrated markings 31 along its length to assist in the proper positioning of the weights. At the left end of beam 24 is a pointer 32, the end of which is adjacent to calibrated markings 25 on base 26 of scale 23.

At the right end of balance beam 24 is located a loop 33 from which is suspended weighing receptacle 34 on a hook bracket 35. Weighing receptacle 34 which is shown in the drawings as funnel-shaped includes a conical portion 36 which tapers to a bottom opening 37. A conical plug 38 is disposed within opening 37 of weighing receptacle 34 with the point of the plug extending upwardly. Advantageously, the underside of the plug 38 has a recess 39, the purpose of which will be described hereinafter. Preferably, weighing receptacle 34 includes means such as a lead strip 40 which can be cut to a size to bring the weight of the receptacle to a level that will neutralize the condition of the scale.

Powder delivery means shown in the drawings as funnel 42 is positioned in opening 17 of platform 14. The delivery funnel 42 includes a conical portion 43 tapering downwardly into a cylindrical portion 44. Advantageously, the lower end of cylindrical portion 44 has an opening 46 which is of a size to receive a cartridge or shell casing. Preferably, the cylindrical portion 44 has a lower part 47 which is removable from the upper part thereof. A series of lower parts 47 with different internal bores can be interchanged to provide the correct fit for particular cartridge sizes.

Actuating means shown as vertical rod 50 is disposed adjacent to cylindrical portion 44 of funnel 42. Rod 50 extends upwardly through the conical portion 43 of the funnel 42 with the upper end of the rod bearing against the underside of the conical plug 38. As shown in the drawings, rod 50 has stop means 52 disposed thereon to limit the downward travel of the rod. Advantageously, rod 50 extends through opening 51 of the conical portion 43 with pointed stop means 52 being mounted on the end of the rod and located within the conical portion 43 of funnel 42. Preferably, stop 52 has a tapered surface on one side which bears against the conical portion 43 from the inside thereof to maintain the orientation of a handle 53 affixed to rod 50. Mounting the stop 52 on the end of the rod 50 and forming a point thereon facilitates orientation of the upper end of the rod with the recess 39 in the underside of plug 38.

Powder-supplying means shown as powder measure 55 is mounted in opening 20 of upper platform 19. The powder measure 55 has a reservoir 56 with a rotatable handle 57 and a dispensing tube 58. A secondary powder supply is powder trickler 60 which is positioned in recess 18 of platform 14. The powder trickler 60 has a reservoir 61, a rotatable handle 62 and a dispensing spout 63. Powder measure 55 and powder trickler 60 are commercially available in a variety of designs.

In the operation of the novel weighing apparatus of the present invention, powder is added to powder measure 55 and powder trickler 60, and the weights 29, 30 and 48 on beam 24 are moved to preselected positions. Next, the upper end of a cartridge is inserted into opening 46 of funnel 42. Handle 57 of powder measure 55 is rotated to deliver into weighing receptacle 34 a quantity of powder slightly less than that to be charged into the cartridge. Handle 62 of powder trickler 60 then is rotated to slowly deliver powder from spout 63 into receptacle 34. When sufficient powder has been added to receptacle 34 to balance scale 23, handle 53 on the lower end of rod 50 is raised, moving the rod upward and causing plug 38 to separate from opening 37 in the bottom of receptacle 34. This permits the powder to fall through opening 37 and into funnel 42. Since funnel 42 is open at the bottom, the powder will fall directly into cartridge 64, the open end of which has been inserted into opening 46 of the funnel.

The cartridge 64 then is removed and a new cartridge substituted. The filling procedure is repeated by turning handle 57 and handle 62 to add powder to receptacle 34 until scale 23 is balanced, then raising handle 53 to allow the powder to fill the cartridge. The filling of cartridges can be accomplished very quickly with the apparatus of the invention by handling the cartridges with the left hand and manipulating handles 55, 60 and 53 in sequence with the right hand since neither hand has to touch the scale 23 or the weighing receptacle 34.

The above description and the accompanying drawings show that the present invention provides a novel apparatus for weighing and delivering exact quantities of powder on a repetitive basis. The apparatus is operated without touching or removing the weighing pan from the scale. This enables powder to be divided into unit quantities very quickly and in a simple straight-forward manner. Since the pan and scale do not have to be touched after the apparatus is set up, the risk of accidentally disturbing the scale and its settings is substantially eliminated.

Furthermore, the apparatus of the invention permits the unit quantities of powder to be transferred directly to cartridges sequentially positioned below the delivery outlet so spillage of powder is reduced to a minimum. Also, the apparatus can be operated successfully with very little instruction. Moreover, the apparatus can be operated without special care so the user can direct his attention more fully to the loading procedures. In addition, the apparatus is simple in design and can be fabricated from commercially available components relatively inexpensively.

It will be apparent that various modifications can be made in the particular weighing apparatus described in detail above and shown in the drawings within the scope of the invention. For example, the size and configuration of the various components can be changed to meet particular requirements. Therefore, the scope of the invention is to be limited only by the following claims.

What is claimed is:

1. Weighing apparatus including a supporting stand, a balance scale disposed on said supporting stand, said balance scale having a beam pivotally supported on a fulcrum and a weighing receptacle suspended from said beam adjacent one end thereof, powder-supplying means disposed on said supporting stand above said weighing receptacle, unit dispensing means associated with said powder-supplying means, and powder delivery means disposed on said supporting stand below said weighing receptacle; said weighing receptacle including a conical portion tapering to a bottom opening, a conical plug disposed within said opening with the point of said plug extending upwardly toward said power-supplying means, said powder delivery means including a conical portion tapering downwardly into a cylindrical portion, actuating means disposed adjacent said cylindrical portion and extending upwardly through said conical portion with the upper end thereof bearing against the underside of said conical plug, stop means associated with said actuating means to limit the downward travel thereof, and handle means affixed to the lower end of said actuating means.

2. Weighing apparatus according to claim 1 wherein said weighing receptacle includes means for adjusting the weight thereof.

3. Weighing apparatus according to claim 1 wherein said powder-supplying means includes secondary powder trickling means.

4. Weighing apparatus according to claim 1 wherein said supporting stand has an upper portion supporting said powder-supplying means and a lower portion supporting said scale and said powder delivery means.

5. Weighing apparatus according to claim 1 wherein said conical portion of said powder delivery means has an opening through which said actuating means extends.

6. Weighing apparatus according to claim 1 wherein said actuating means is a rod.

7. Weighing apparatus according to claim 1 wherein said stop means is located within said conical portion of said powder delivery means.

8. Weighing apparatus according to claim 7 wherein said stop means includes a tapered surface which bears against said conical portion of said powder delivery means.

9. Weighing apparatus according to claim 1 wherein the lower end of said cylindrical portion of said powder delivery means has a cartridge receiving opening.

10. Weighing apparatus according to claim 9 wherein the lower part of said cylindrical portion of said powder delivery means is separable from the upper part thereof.

* * * * *